(12) United States Patent
Schmidt

(10) Patent No.: US 7,938,605 B2
(45) Date of Patent: May 10, 2011

(54) WINCH ATTACHMENT

(76) Inventor: George Schmidt, Cayuga (CA)

( * ) Notice: Subject to any disclaimer, the term of this patent is extended or adjusted under 35 U.S.C. 154(b) by 355 days.

(21) Appl. No.: 12/206,268

(22) Filed: Sep. 8, 2008

(65) Prior Publication Data
US 2009/0074531 A1   Mar. 19, 2009

Related U.S. Application Data

(60) Provisional application No. 60/971,948, filed on Sep. 13, 2007.

(51) Int. Cl.
*B61D 45/00* (2006.01)

(52) U.S. Cl. ..................................................... 410/103

(58) Field of Classification Search .................. 410/100, 410/103; 16/110.1, 422; 24/68 CD; 74/543, 74/545; 254/199, 213, 222, 223
See application file for complete search history.

(56) References Cited

U.S. PATENT DOCUMENTS

| | | | |
|---|---|---|---|
| 1,045,461 A * | 11/1912 | Tuttle | 81/128 |
| 3,428,331 A | 2/1969 | Morgan et al. | |
| 4,510,652 A | 4/1985 | van Iperen | |
| 5,775,175 A | 7/1998 | Salemno et al. | |
| 6,467,716 B1 | 10/2002 | Hamilton | |
| 6,467,755 B2 * | 10/2002 | Reilly et al. | 254/223 |
| 6,705,597 B1 * | 3/2004 | Reilly et al. | 254/223 |
| 6,824,339 B1 | 11/2004 | Childers | |
| 6,854,939 B2 * | 2/2005 | Im | 410/100 |
| 7,410,336 B2 * | 8/2008 | Parks | 410/156 |

* cited by examiner

*Primary Examiner* — H Gutman

(57) ABSTRACT

The present device is a combination winch attachment and a winch winding shaft end wherein the winch attachment including a body for demountably attaching to the shaft end, the winch attachment further including a mechanism for releaseably securing the body to the shaft end thereby placing the winch attachment in an engaged position wherein the winch attachment and shaft end rotate in unison, and the winch attachment further including a coupling mechanism for receiving rotational forces to the body, such that the body in turn rotates the shaft end when the winch attachment is in the engaged position.

19 Claims, 5 Drawing Sheets

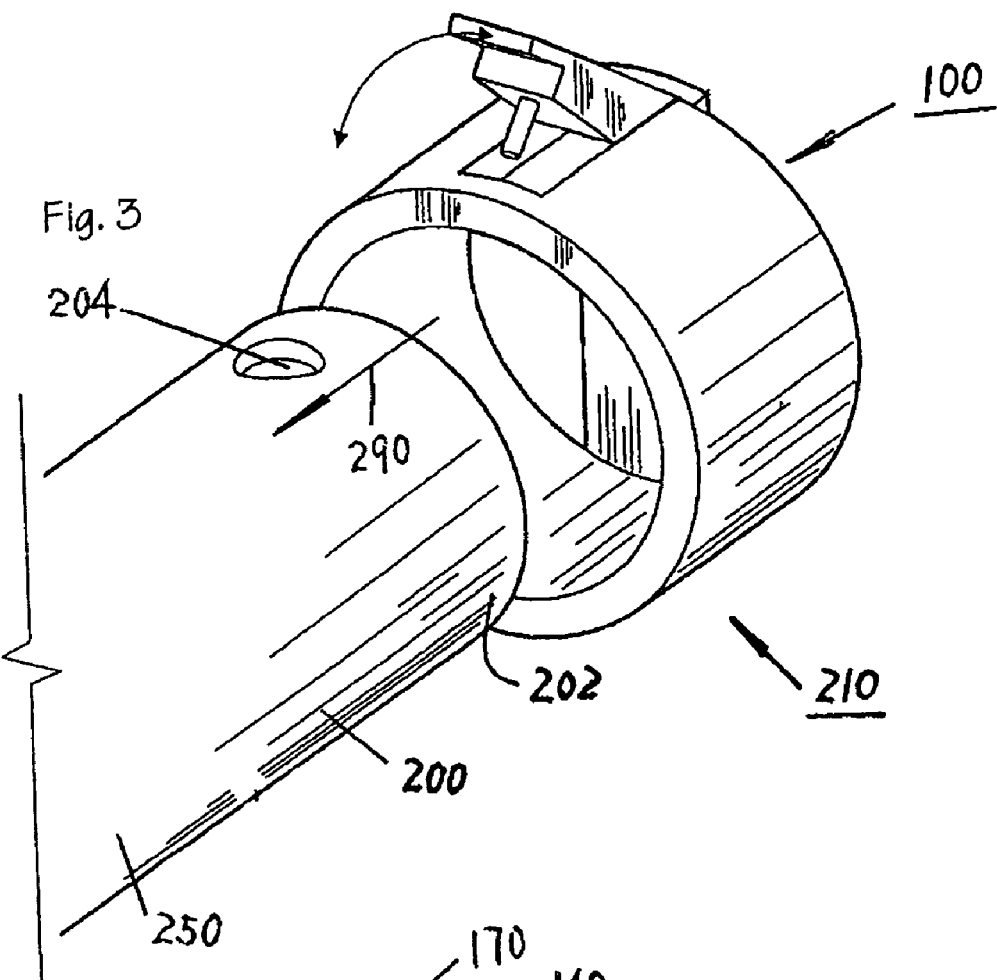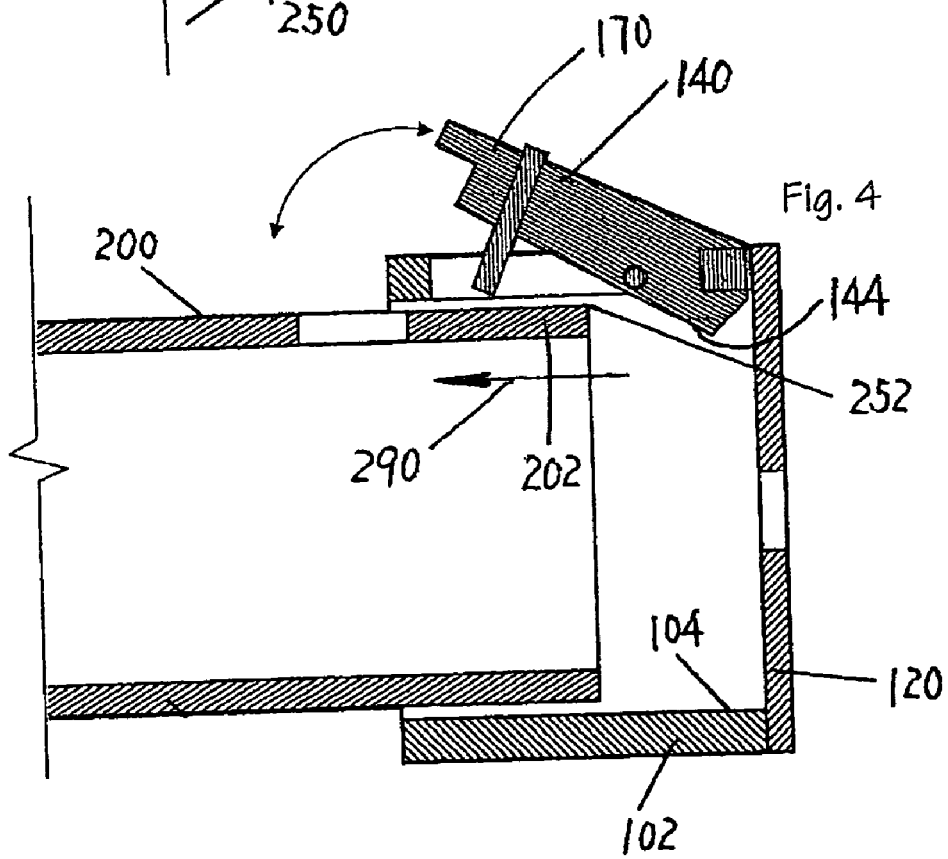

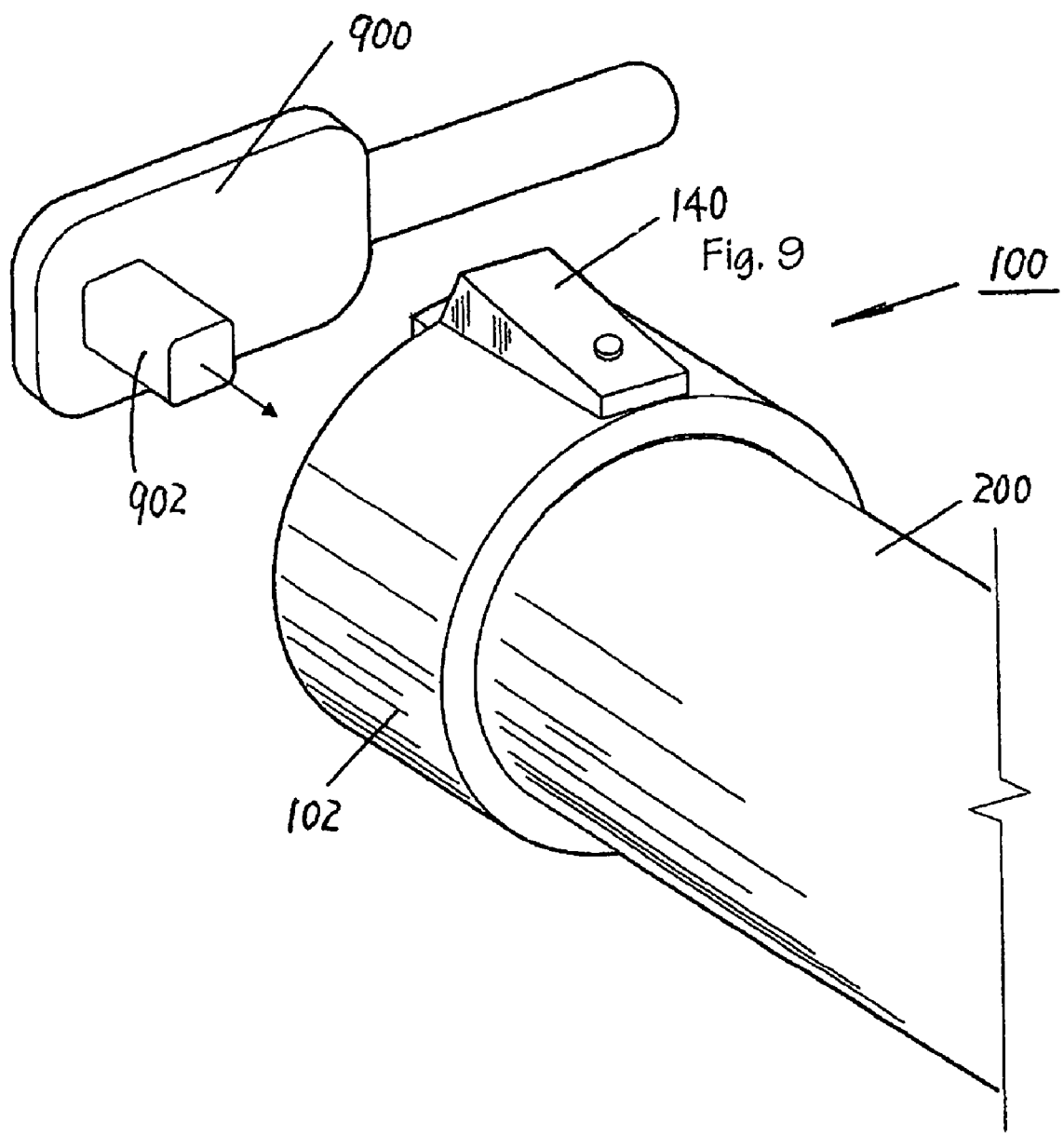

WINCH ATTACHMENT

FIELD OF THE INVENTION

The present invention claims priority from previously filed provisional application filed on Sep. 13, 2007 application No. 60/971,948 inventor George Schmidt under the title; Winch Attachment. The present device relates to winches and in particular relates to a winch attachment.

BACKGROUND OF THE INVENTION

Currently many winches have a winch pipe which is used to turn the winch mechanism of the winch. The winch pipe end usually contains an aperture which can either be a round hole or a slot configuration through which a crowbar and/or other type of bar is placed in order to turn the winch pipe, which in turn turns the winch mechanism. This type of winch is particularly prevalent on tractor trailers, wherein numerous winches are normally attached to the outer edges of the trailer for strapping down material which is being transported on the trailer. Flatbed truck trailers, in particular use winches for winching straps that are used to secure the load to the flatbed trailer. The present device is a winch attachment which fits onto the end of the winch pipe end of currently existing winches.

SUMMARY OF THE INVENTION

In combination a winch attachment and a winch winding shaft end comprising;
 a) the winch attachment including a body for demountably attaching to the shaft end;
 b) the winch attachment including a means for releaseably securing the body to the shaft end thereby placing the winch attachment in an engaged position wherein the winch attachment and shaft end rotate in unison;
 c) the winch attachment including a coupling means for receiving rotational forces to the body, such that the body in turn rotates the shaft end when the winch attachment is in the engaged position.

Preferably the body being cylindrical and the shaft end being cylindrical.

Preferably wherein the winch attachment dimensioned to slide onto the shaft end and moveable between an engaged position and a disengaged position, such that in the disengaged position the winch attachment and shaft end are no longer secured together and are free to rotate independently.

Preferably wherein the securing means including a pivot arm pivoting between a closed position when the winch attachment in the engaged position and the pivot arm pivoting to an open position when the winch attachment in a disengaged position.

Preferably wherein the winch attachment including a longitudinally oriented slot defined in the body for receiving the pivot arm therein.

Preferably wherein pivot arm pivotally attached to the body with a transversely mounted pin mounted in a pin aperture defined in the body.

Preferably wherein the pivot arm including and a perpendicularly downwardly depending finger rigidly attached to the pivot arm such that in the closed position the finger engages with the shaft end thereby ensuring the body and shaft end rotate in unison.

Preferably wherein the shaft end including an aperture for receiving the finger therein thereby placing the winch attachment in the engaged position.

Preferably wherein in the open position the finger disengages from the shaft end allowing the body and shaft end to rotate independently.

Preferably wherein the winch attachment further including a magnet for maintaining the pivot arm in the open position.

Preferably wherein the pivot arm further including a magnet for maintaining the pivot arm in the open position.

Preferably wherein the magnet is mounted in the pivot arm such that in the open position the magnet is proximate magnetic material thereby maintaining the pivot arm in the open position, wherein in the closed position the magnet is pivoted away from nearby magnetically attractive material and does not affect the positioning of the pivot arm.

Preferably wherein the pivot arm including a bottom surface and the shaft end including a pipe end edge, wherein urging the body over the shaft end causes contact between the pipe end edge and pivot arm bottom surface thereby urging pivot arm to pivot from the open position to the closed position.

Preferably wherein the coupling means including a transversely mounted bracket attached to a rear face of the body, the bracket including an inner side which abuts against a portion of the pivot arm.

Preferably wherein the pivot arm including an open face with a magnet mounted flush there with such that the open face makes abutting contact with the inner side of the bracket when the pivot arm is in the open position thereby the magnetic attraction maintaining the pivot arm in the open position.

Preferably wherein the pivot arm including a closed face dimensioned to abut against the inner side of the bracket when the pivot arm is in the closed position.

Preferably wherein the coupling means including a transversely mounted bracket and including a centrally located opening dimensioned to receive a drive socket therein.

Preferably wherein the centrally located opening preferably being a square aperture dimensioned to receive a male square drive end.

Preferably wherein in the closed position the pivot arm is oriented such that the pivot arm cannot pivot to the open position unless the winch attachment is first urged longitudinally off of the shaft end.

Preferably wherein in the closed position the pivot arm bottom surface is oriented parallel along the shaft end outer diameter such that the pivot arm cannot pivot to the open position unless the winch attachment is first urged longitudinally off of the shaft end.

BRIEF DESCRIPTION OF THE DRAWINGS

The present invention will now be described by way of example only with reference to the following drawings in which:

FIG. 3 is a partial perspective view of a winch pipe together with a winch attachment.

FIG. 4 is a cross sectional view of a winch pipe having a winch attachment partially mounted thereon.

FIG. 9 is a schematic perspective view of a winch pipe together with a winch attachment mounted thereon together with a ratchet showing assembly of these components.

DETAILED DESCRIPTION OF THE PREFERRED EMBODIMENT

The present device is a winch attachment 100 which is shown in the attached figures.

Figure 1:
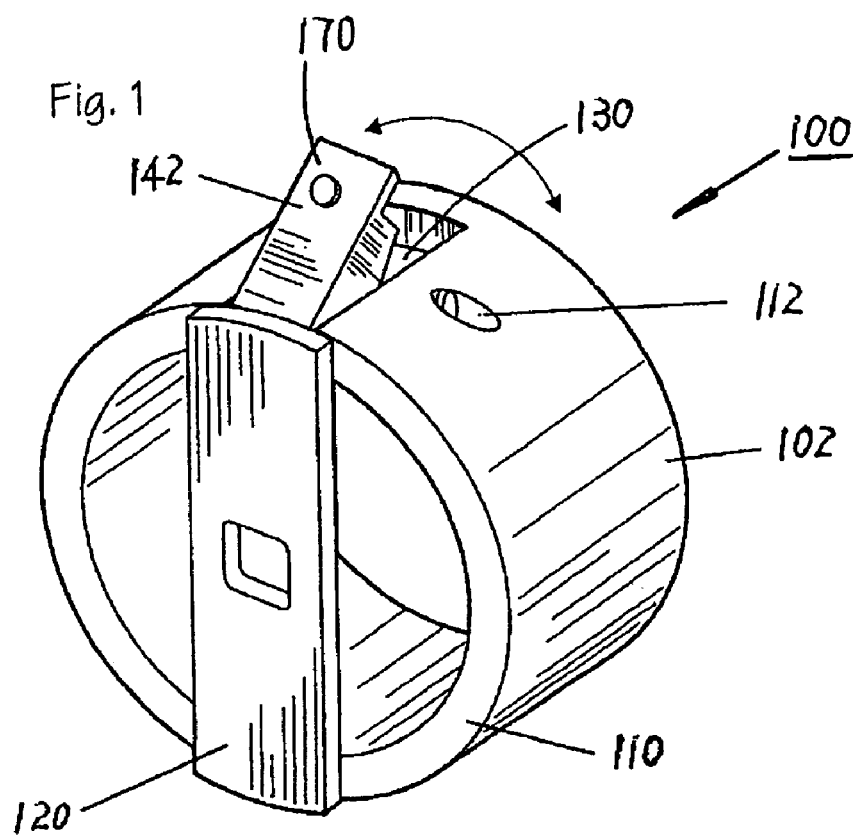
FIG. 1 is an end perspective view of the present device, a winch attachment.
Figure 2:
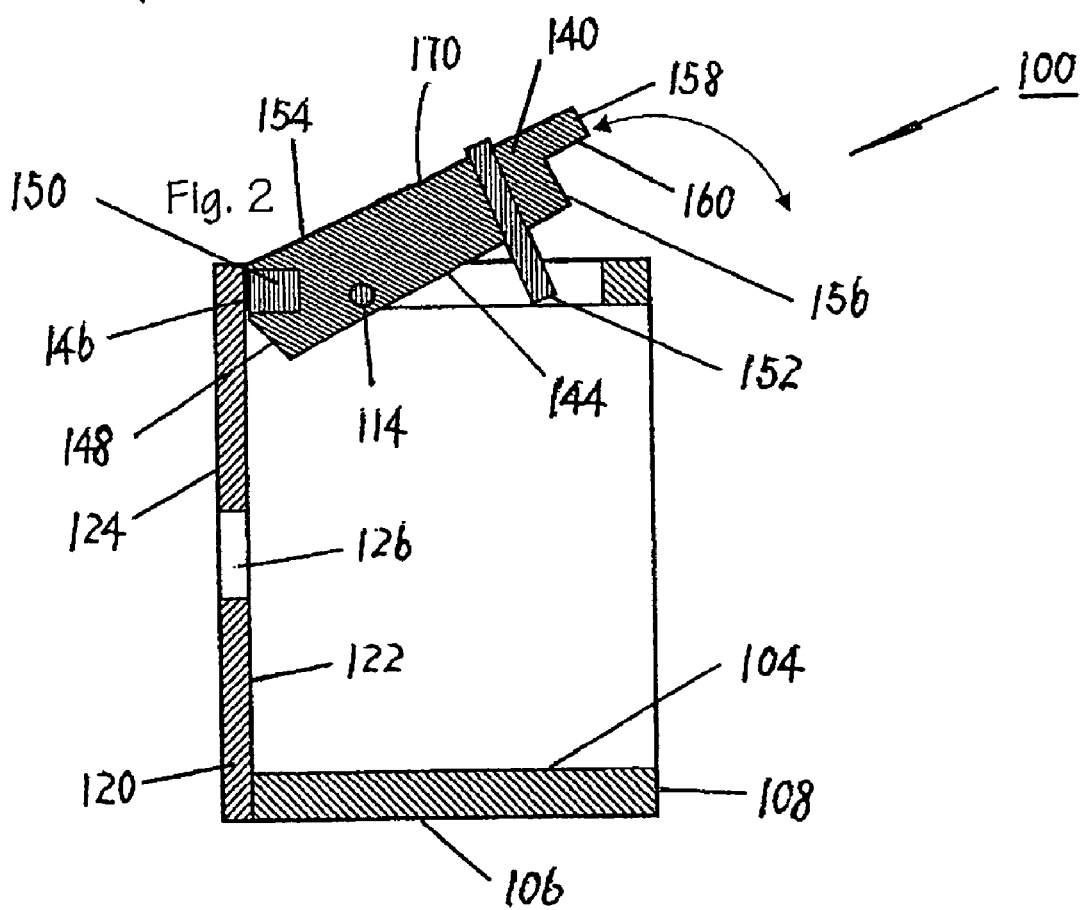
FIG. 2 is a cross sectional view of the winch attachment shown in FIG. 1.

Referring specifically to FIGS. 1 and 2, first of all winch attachment shown generally as 100 includes body 102 which is shown as cylindrical having an inner diameter 104 and an outer diameter 106, a front face 108 and a rear face 110. Body 102 also includes a pin aperture 112 for receiving a pivot pin 114 therein using an interference fit.

Rigidly attached to body 102 is a transversely mounted bracket 120 which includes an inner side 122 and an outer side 124 and an opening 126 which is a square opening designed to accept the typical square end 902 of a ratchet 900 which is shown in FIG. 9 or any other suitable type drive socket. The bracket 120 couples a rotating drive to the body 102 which in turn rotates the winch pipe 200.

Body 102 also includes a slot 130 which is dimensioned and adapted to receive pivot arm 140 therein as shown in the drawings and described below. Pivot arm 140 includes a top surface 142, a bottom surface 144, an open face 146, a closed face 148, a magnet 150 and a finger 152. Pivot arm 140 also includes a rear portion 154, a forward portion 156 and a lip 158 including a stop surface 160 approximate the forward portion 156.

Figure 5:
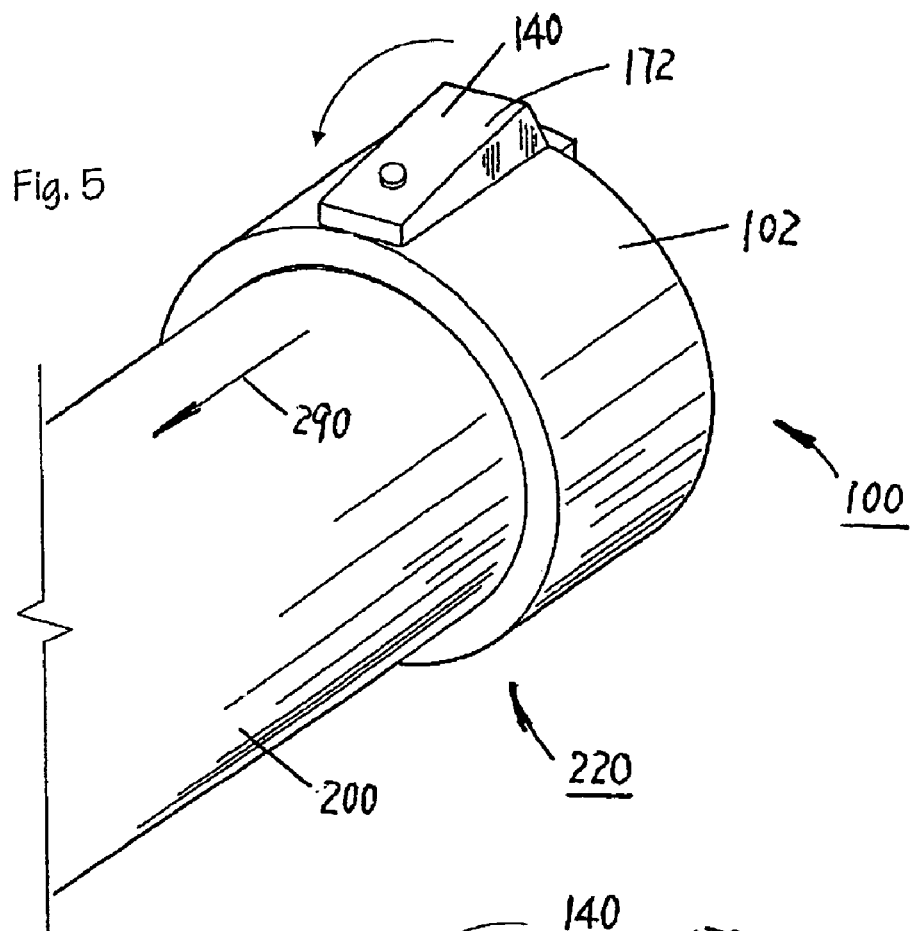
FIG. 5 is a partial schematic perspective view of a winch pipe having a winch attachment mounted thereon.
Figure 6:
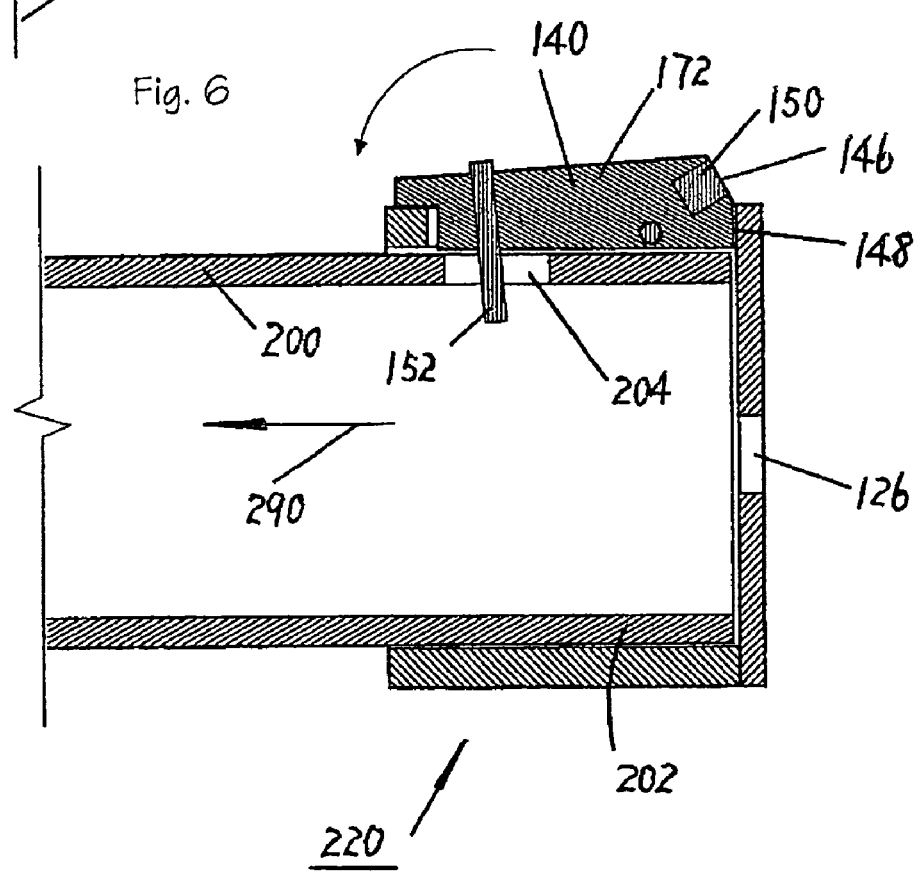
FIG. 6 is a partial side cross sectional view of a winch pipe shown in the engaged position with a winch attachment mounted thereon.
Figure 7:
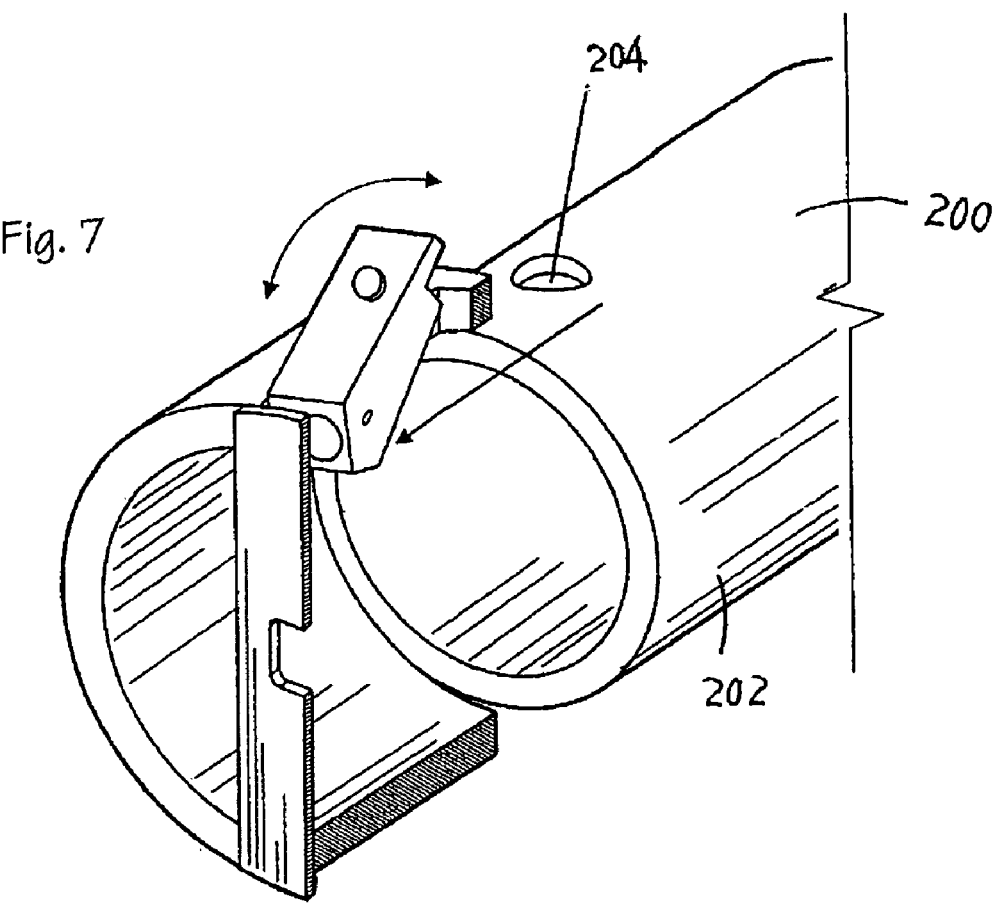
FIG. 7 is a schematic partial cut away perspective view of the winch attachment together with a winch pipe being shown assembled.

Pivot arm 140 is shown in the open position 170 in FIGS. 1 and 2 and in the closed position 172 in FIGS. 5 and 6. Referring now to FIGS. 3 through 9, these figures typically also show a winch pipe 200 having a winch end 202 and an aperture 204. Winch pipe 200 is a typical winch pipe which is found on existing winches to which the current apparatus namely winch attachment 100 will demountably attach to winch pipe 200 which may be a solid shaft rather than a hollow pipe for example or may take on other configurations having similar functionality. Winch pipe 200 is more generally referred to as the winch winding shaft which is turned or rotated in order to effect the winching action. Winch winding shaft end or simply shaft end is depicted as winch pipe end 202 in the figures. Shaft end may be as depicted as winch pipe end 202 or take on any other form known in the art of winching.

In FIG. 3 for example, winch attachment 100 is shown in a disengaged position 210, not having winch attachment 100 mounted on winch pipe 200.

FIGS. 5 and 6 show for example, winch pipe 200 having winch attachment 100 mounted thereon to the winch pipe end 202. Winch attachment 100 is in the engaged position 220 as shown in FIGS. 5 and 6 and pivot arm 140 is in the closed position 172.

In use, the present apparatus, namely winch attachment 100 can be demountably attached to a winch pipe 200, having a winch pipe end 202 and an aperture 204. This winch pipe 200 arrangement is typical of existing winches, wherein the number of apertures 204 can vary significantly between manufacturers. In addition, the shape and size of the aperture can also vary from a round hole as shown in FIG. 3 and/or a slot not shown in the diagrams.

In order to assemble winch attachment 100 onto winch pipe end 202, winch attachment 100 is urged onto the outer diameter 250 of winch pipe end 202. The inner diameter 104 of winch attachment is dimensioned to receive therein outer diameter 250 of winch pipe 200. Pipe end edge 252 will make contact with bottom surface 144 of pivot arm 140 as winch attachment 100 is forcibly urged over top of winch pipe 200 in the longitudinal direction shown by arrow 290. This causes pivot arm 140 to pivot about pivot pin 114, thereby forcibly urging finger 152 of pivot arm 140 into aperture 204 of winch pipe end 202. Pivot arm 140 is shown in the open position 170 in FIG. 4 and is held there by a magnet 150 which is imbedded into open face 146. By continuing to urge winch attachment 100 over winch pipe end 202, eventually pivot arm 140 will pivot into a closed position 172 as shown in FIGS. 5 and 6 wherein Finger 152 passes through aperture 204 in winch pipe end 202 as best shown in cross sectional view in FIG. 6.

Pivot arm 140 will come to a closed position 172 wherein stop surface 160 makes contact with a portion of the outer diameter 106 of body 102 and as well closed face 148 will make contact with an inner side 122 of bracket 120. In addition, bottom surface 144 may also make contact with the outer diameter 250 of winch pipe 200. In any event, pivot arm 140 is prevented from pivoting past the closed position 172 as shown in FIG. 6 by one or more of these factors.

Figure 8:
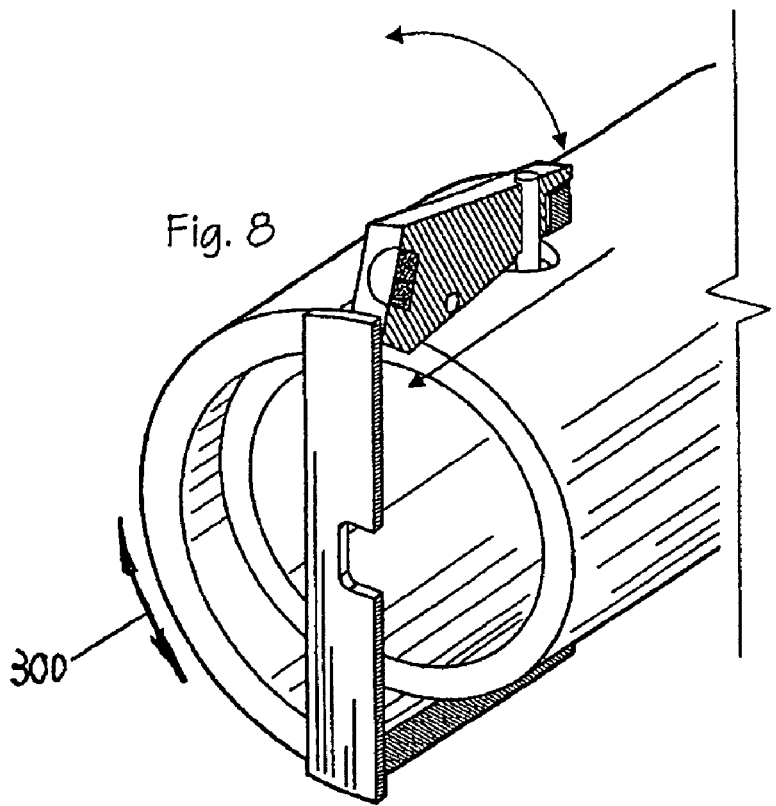
FIG. 8 is a partial schematic cross sectional view of a winch pipe together with the winch attachment mounted thereon in the engaged position.

As shown in FIG. 6, winch pipe 200 is now in the engaged position 220, such that forcibly rotating winch attachment 100 in the rotational direction shown as 300 in FIG. 8 will cause finger 152 to make contact with pipe end 202 thereby forcibly urging winch pipe 200 to rotate in the same direction as the winch attachment 100 is rotated. In other words, winch attachment 100 will now rotate in unison with winch pipe 200, wherein the rotational forces of the winch attachment are transferred to the pipe by finger 152 making contact with winch pipe 200.

In order to rotate winch attachment 100, one could use a ratchet 900 shown in FIG. 9 which has a square end 902 which is dimensioned to be accepted within opening 126 of bracket 120. Opening 126 preferably is a female square aperture dimensioned to receive a standard male square drive end known in the art. Ratchet 900 is of the type well known in the art and which are readily commercially available. It may me a manual ratchet as depicted or a power driven device such as a drill with a male square drive end. The benefits of winch attachment 100 are apparent to those skilled in the art and include quick mounting and dismounting of winch attachment 100 from the disengaged position 210, wherein the pivot arm 140 is in the open position 170 to the engaged position 220, wherein the pivot arm 140 is in the closed position 172.

In order to remove winch attachment 100 from winch pipe 200, one simply pulls on winch attachment 100, by pulling winch attachment 100 away from winch pipe end 202, the edge of aperture 204 defined within winch pipe end 202 will urge finger 152 upwardly and back into the open position 170 as shown in FIG. 4. Therefore, engagement and disengagement of winch attachment 100 is simply accomplished by urging winch attachment 100 either onto winch pipe end 202 or off of winch pipe end 202 in a linear sliding motion as shown in FIGS. 3 through 6.

The present embodiment depicts winch attachment 100 mounting over top of winch pipe 200. It could also be designed to mount within the hollow interior of winch pipe 200 and operate in similar fashion.

It should be apparent to persons skilled in the arts that various modifications and adaptation of this structure described above are possible without departure from the spirit of the invention the scope of which defined in the appended claim.

I claim:

1. In combination a winch attachment and a winch winding shaft end comprising:
   a) the winch attachment including a body for demountably attaching to the shaft end;
   b) the winch attachment including releaseably securing the body to the shaft end thereby placing the winch attachment in an engaged position wherein the winch attachment and shaft end rotate in unison;
   c) the winch attachment including a coupling means for receiving rotational forces to the body, such that the body in turn rotates the shaft end when the winch attachment is in the engaged position;
   d) the winch attachment including a pivot arm pivoting between a closed position when the winch attachment is in the engaged position and the pivot arm pivoting to an open position when the winch attachment in a disengaged position.

2. The combination claimed in claim 1 wherein the body being cylindrical and the shaft end being cylindrical.

3. The combination claimed in claim 1 wherein the winch attachment is dimensioned to slide onto the shaft end and moveable between the engaged position and the disengaged position, such that in the disengaged position the winch attachment and shaft end are no longer secured together and are free to rotate independently.

4. The combination claimed in claim 1 wherein the winch attachment including a longitudinally oriented slot defined in the body for receiving the pivot arm therein.

5. The combination claimed in claim 4 wherein pivot arm pivotally attached to the body with a transversely mounted pin mounted in a pin aperture defined in the body.

6. The combination claimed in claim 1 wherein the pivot arm including and a perpendicularly downwardly depending finger rigidly attached to the pivot arm such that in the closed position the finger engages with the shaft end thereby ensuring the body and shaft end rotate in unison.

7. The combination claimed in claim 6 wherein the shaft end including an aperture for receiving the finger therein thereby placing the winch attachment in the engaged position.

8. The combination claimed in claim 6 wherein in the open position the finger disengages from the shaft end allowing the body and shaft end to rotate independently.

9. The combination claimed in claim 1 wherein the winch attachment further including a magnet for maintaining the pivot arm in the open position.

10. The combination claimed in claim 1 wherein the pivot arm further including a magnet for maintaining the pivot arm in the open position.

11. The combination claimed in claim 1 wherein the magnet is mounted in the pivot arm such that in the open position the magnet is proximate magnetic material thereby maintaining the pivot arm in the open position, wherein in the closed position the magnet is pivoted away from nearby magnetically attractive material and does not affect the positioning of the pivot arm.

12. The combination claimed in claim 1 wherein the pivot arm including a bottom surface and the shaft end including a pipe end edge, wherein urging the body over the shaft end causes contact between the pipe end edge and pivot arm bottom surface thereby urging pivot arm to pivot from the open position to the closed position.

13. The combination claimed in claim 1 wherein the coupling means including a transversely mounted bracket attached to a rear face of the body, the bracket including an inner side which abuts against a portion of the pivot arm.

14. The combination claimed in claim 13 wherein the pivot arm including an open face with a magnet mounted flush there with such that the open face makes abutting contact with the inner side of the bracket when the pivot arm is in the open position thereby the magnetic attraction maintaining the pivot arm in the open position.

15. The combination claimed in claim 14 wherein the pivot arm including a closed face dimensioned to abut against the inner side of the bracket when the pivot arm is in the closed position.

16. The combination claimed in claim 1 wherein the coupling means including a transversely mounted bracket and including a centrally located opening dimensioned to receive a drive socket therein.

17. The combination claimed in claim 16 wherein the centrally located opening preferably being a square aperture dimensioned to receive a male square drive end.

18. The combination claimed in claim 12 wherein in the closed position the pivot arm is oriented such that the pivot arm cannot pivot to the open position unless the winch attachment is first urged longitudinally off of the shaft end.

19. The combination claimed in claim 12 wherein in the closed position the pivot arm bottom surface is oriented parallel along the shaft end outer diameter such that the pivot arm cannot pivot to the open position unless the winch attachment is first urged longitudinally off of the shaft end.

* * * * *